United States Patent
Tsuji

(10) Patent No.: US 10,565,712 B2
(45) Date of Patent: Feb. 18, 2020

(54) IMAGE PROCESSING APPARATUS AND METHOD FOR CONTROLLING THE SAME

(71) Applicant: CANON KABUSHIKI KAISHA, Tokyo (JP)

(72) Inventor: Ryosuke Tsuji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/621,269

(22) Filed: Jun. 13, 2017

(65) Prior Publication Data

US 2017/0365063 A1 Dec. 21, 2017

(30) Foreign Application Priority Data

Jun. 21, 2016 (JP) ................................ 2016-122880
Apr. 21, 2017 (JP) ................................ 2017-084763

(51) Int. Cl.

| G06T 7/00 | (2017.01) |
| G06T 7/215 | (2017.01) |
| G06K 9/00 | (2006.01) |
| G06T 7/11 | (2017.01) |
| H04N 5/232 | (2006.01) |
| G06T 7/246 | (2017.01) |

(52) U.S. Cl.
CPC .......... *G06T 7/215* (2017.01); *G06K 9/00744* (2013.01); *G06T 7/11* (2017.01); *G06T 7/248* (2017.01); *H04N 5/23212* (2013.01); *H04N 5/23219* (2013.01)

(58) Field of Classification Search
CPC .......... G06T 7/215; G06T 7/11; G06T 7/248; G06K 9/00744; G06K 9/3233; G06K 9/3241; G06K 9/4652; H04N 5/232; H04N 5/23212; H04N 5/23219; H04N 5/2351; H04N 5/2353; H04N 5/243; H04N 9/045

See application file for complete search history.

(56) References Cited

U.S. PATENT DOCUMENTS

| 7,573,505 | B2 | 8/2009 | Kawaguchi et al. |
| 2004/0208114 | A1* | 10/2004 | Lao .................... H04N 5/23219 369/125 |
| 2009/0010549 | A1* | 1/2009 | Muramatsu .......... G06K 9/6256 382/209 |
| 2009/0135292 | A1* | 5/2009 | Muramatsu ............ G03B 13/18 348/349 |
| 2013/0010095 | A1* | 1/2013 | Aoki .................. G06K 9/00268 348/77 |

(Continued)

FOREIGN PATENT DOCUMENTS

JP 2005-318554 A 11/2005

*Primary Examiner* — Ping Y Hsieh
(74) *Attorney, Agent, or Firm* — Venable LLP

(57) ABSTRACT

An image processing apparatus capable of accurate area tracking, and a method for controlling the same are provided. An image area for extracting a feature amount is identified based on a specified position. A plurality of images are searched for an image that corresponds to the image area using the feature amount extracted from the identified image area. The image area is identified using distance information if distance information that satisfies a reliability condition has been obtained regarding an area that includes the specified position, and without using the distance information if the distance information that satisfies the reliability condition has not been obtained.

5 Claims, 11 Drawing Sheets

(56) References Cited

U.S. PATENT DOCUMENTS

| | | | |
|---|---|---|---|
| 2015/0098652 A1* | 4/2015 | Chen | G06T 7/136 382/180 |
| 2015/0146988 A1* | 5/2015 | Oami | H04N 5/232 382/197 |

* cited by examiner

FEATURE AMOUNT

SEARCH AREA

FEATURE AMOUNT

SEARCH AREA

RESULT OF SUBJECT AREA ESTIMATION USING COLOR INFORMATION

SUBJECT MAP BASED ON COLOR INFORMATION

INPUT IMAGE

RESULT OF SUBJECT AREA ESTIMATION USING COLOR INFORMATION AND DISTANCE INFORMATION

SUBJECT MAP BASED ON COLOR INFORMATION AND DISTANCE INFORMATION

MAP BASED ON DISTANCE INFORMATION

CAPTURED IMAGE

DISTANCE MAP

CAPTURED IMAGE

DISTANCE MAP

IMAGE PROCESSING APPARATUS AND METHOD FOR CONTROLLING THE SAME

BACKGROUND OF THE INVENTION

Field of the Invention

The present invention relates to an image processing apparatus and a method for controlling the same, and relates in particular to a technique for tracking a specific area between images.

Description of the Related Art

A temporal movement of an area can be detected by searching one or more images captured after a time t for an area similar to an area in an image captured at the time t. For example, by detecting a movement of a specific subject area (face area) while capturing a video, the specific subject can be kept in focus, and exposure conditions can be dynamically changed so that the exposure level of the specific subject is correct (Japanese Patent Laid-Open No. 2005-318554).

When an area similar to a specific image area is searched for, a technique called matching is commonly used. For example, in template matching, a pixel pattern in a certain image area is set as a feature amount (template), the degree of similarity (e.g. correlation amount) is calculated at each position within a search area in another image while relatively shifting the template position, and the position with the highest degree of similarity is detected. If it is determined that the degree of similarity at the detected position is sufficiently high, it is estimated that an image area with the same pattern as that of the template is present at this position.

The accuracy of the search using matching significantly depends on how the feature amount to be used in the matching is set. For example, in the case of tracking the face area of a specific person, if the pixel pattern in an area that includes only a portion of the face area is set as the feature amount, detection errors are likely to occur due to the feature amount of the face being insufficient. Conversely, if a pixel pattern that includes the entire face area but in which a peripheral area (e.g. background area) of the face area occupies a large proportion is set as the feature amount, the degree of similarity of the background contributes more, and thus detection errors are likely to occur.

SUMMARY OF THE INVENTION

The present invention has been made in view of the foregoing problems in the conventional technique, and provides an image processing apparatus capable of accurate area tracking, and a method for controlling the same.

According to an aspect of the present invention, there is provided an image processing apparatus comprising: circuitry which: identifies, based on a specified position, an image area for extracting a feature amount within an image; extracts the feature amount from the image area; and searches a plurality of images for an area that corresponds to the image area, using the feature amount, wherein, if distance information that satisfies a reliability condition has been obtained regarding an area that includes the specified position, the circuitry identifies the image area using the distance information, and if the distance information that satisfies the reliability condition has not been obtained, the circuitry identifies the image area without using the distance information.

According to another aspect of the present invention, there is provided an image capture apparatus comprising: circuitry which: identifies, based on a specified position, an image area for extracting a feature amount within an image; extracts the feature amount from the image area; searches a plurality of images for an area that corresponds to the image area, using the feature amount; and performs focus detection on the area that corresponds to the image area and includes an area similar to the image area wherein, if distance information that satisfies a reliability condition has been obtained regarding an area that includes the specified position, the circuitry identifies the image area using the distance information, and if the distance information that satisfies the reliability condition has not been obtained, the circuitry identifies the image area without using the distance information.

According to a further aspect of the present invention, there is provided an image processing apparatus comprising: circuitry which: identifies, based on a specified position, an image area for extracting a feature amount within an image; extracts the feature amount from the image area; and searches a plurality of images for an area that corresponds to the image area, using the feature amount, wherein, before distance information that satisfies a reliability condition is obtained regarding an area that includes the specified position, the circuitry identifies the image area without using the distance information, and after the distance information that satisfies the reliability condition is obtained regarding the area that includes the specified position, the circuitry identifies the image area using the distance information.

According to another aspect of the present invention, there is provided an image processing apparatus comprising: circuitry which: extracts a feature amount from an image area; and searches a plurality of images for an area similar to the image area, using the feature amount, wherein the circuitry updates the feature amount that is used in search, based on distance information in the area similar to the image area, and distance information in a peripheral area of the area similar to the image area.

According to a further aspect of the present invention, there is provided a method for controlling an image processing apparatus, the method comprising: identifying, based on a specified position, an image area for extracting a feature amount within an image; extracting the feature amount from the image area; and searching a plurality of images for an area that corresponds to the image area, using the feature amount, wherein, in the identifying, if distance information that satisfies a reliability condition has been obtained regarding an area that includes the specified position, the image area is identified using the distance information, and if the distance information that satisfies the reliability condition has not been obtained, the image area is identified without using the distance information.

According to another aspect of the present invention, there is provided a method for controlling an image processing apparatus, the method comprising: identifying, based on a specified position, an image area for extracting a feature amount within an image; extracting the feature amount from the image area; and searching a plurality of images for an area that corresponds to the image area, using the feature amount, wherein, in the identifying, before distance information that satisfies a reliability condition is obtained regarding an area that includes the specified position, the image area is identified without using the distance information, and after the distance information that satisfies the reliability condition is obtained regarding the area that includes the specified position, in the identifying, the image area using the distance information.

According to a further aspect of the present invention, there is provided a method for controlling an image processing apparatus, the method comprising: extracting a feature amount from an image area; and searching a plurality of images for an area similar to the image area, using the feature amount, wherein the feature amount used in the searching is updated based on distance information in the area similar to the image area, and distance information in a peripheral area of the area similar to the image area.

According to another aspect of the present invention, there is provided a non-transitory computer-readable medium storing a computer program including a computer-executable command, the command, upon being executed by a computer, causing the computer to function as an image processing apparatus comprising: circuitry which: identifies, based on a specified position, an image area for extracting a feature amount within an image; extracts the feature amount from the image area; and searches a plurality of images for an area that corresponds to the image area, using the feature amount, wherein, if distance information that satisfies a reliability condition has been obtained regarding an area that includes the specified position, the circuitry identifies the image area using the distance information, and if the distance information that satisfies the reliability condition has not been obtained, the image area is identified without using the distance information.

According to a further aspect of the present invention, there is provided a non-transitory computer-readable medium storing a computer program including a computer-executable command, the command, upon being executed by a computer, causing the computer to function as an image processing apparatus comprising: circuitry which: extracts the feature amount from an image area; and searches a plurality of images for an area similar to the image area, using the feature amount, wherein the circuitry updates the feature amount used in search based on distance information in the area similar to the image area, and distance information in a peripheral area of the area similar to the image area.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. A detailed description will be given below of a digital camera, which serves as an example of an image processing apparatus according to the embodiments of the present invention, with reference to the attached drawings. However, the present invention can also be implemented in electronic devices that do not have an image capture function. Electronic devices in which the present invention can be implemented include, for example, digital cameras, mobile phones, tablet terminals, game machines, personal computers, navigation systems, appliances, robots, and the like, but are not limited thereto.

First Embodiment

Figure 1:
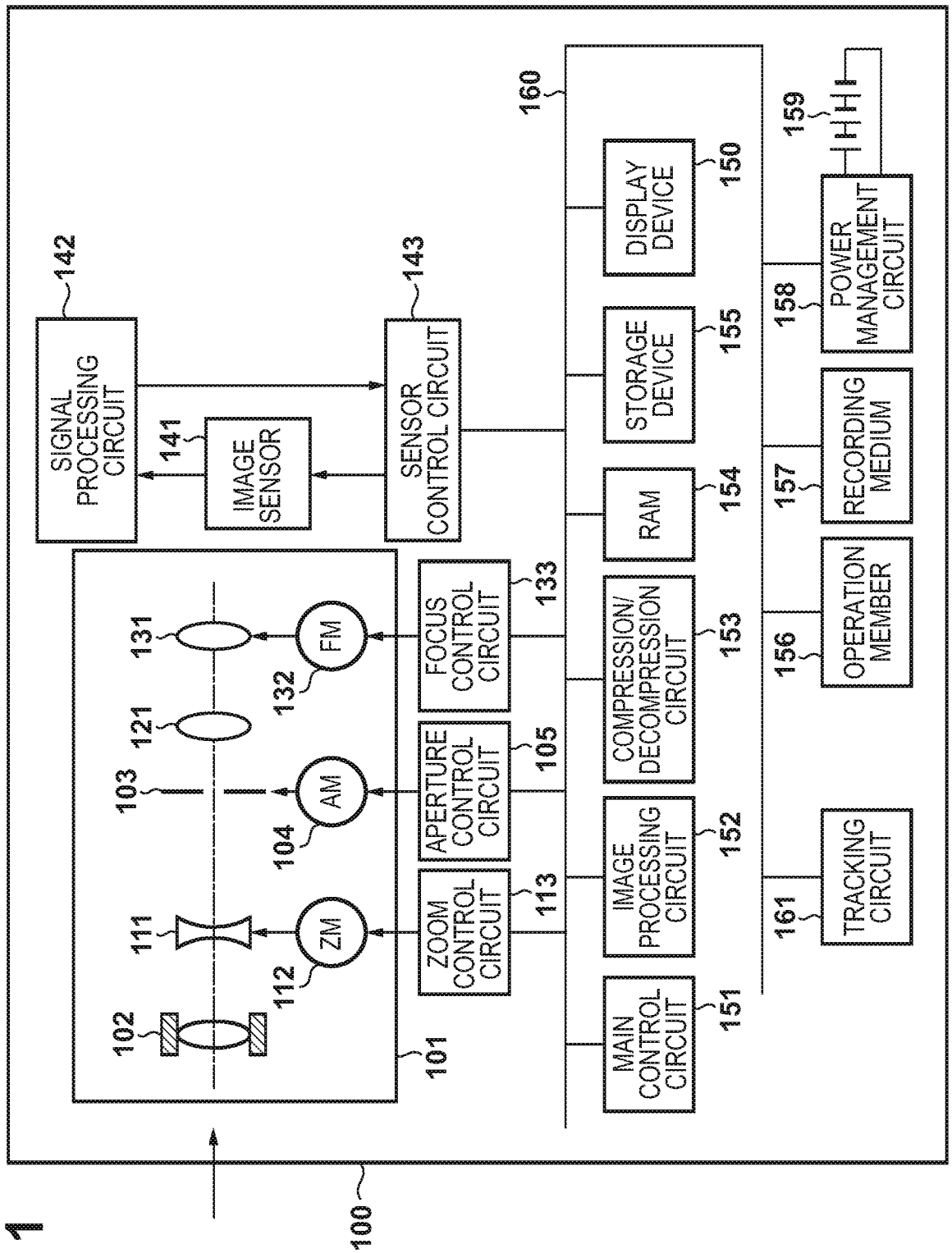
FIG. 1 is a block diagram showing an exemplary functional configuration of a digital camera according to embodiments.

Configuration of image capture apparatus FIG. 1 is a block diagram showing an exemplary functional configuration of a digital camera 100 according to the first embodiment. The digital camera 100 can capture and record videos and still images. Functional blocks in the digital camera 100 are connected to one another in a communicable manner via a bus 160. Operations of the digital camera 100 are realized as a result of a main control circuit 151 (central processing circuit) executing programs to control the functional blocks.

The digital camera 100 according to this embodiment can acquire distance information regarding a captured subject. The distance information may be a distance image in which each pixel value indicates the distance of a corresponding subject, for example. Although the distance information may be acquired using any method, in this embodiment, the distance information is acquired based on parallax images. Although the method to acquire parallax images is not limited either, in this embodiment, parallax images are acquired using an image sensor 141 that includes a plurality of photoelectric conversion elements that share one microlens. Note that parallax images may be acquired by configuring the digital camera 100 as a multiple-lens camera, such as a stereo camera, or data on parallax images captured in any method may be acquired from a storage medium or an external device.

The digital camera 100 includes a tracking circuit 161 that realizes a subject tracking function by continuously searching for an area that is similar to a specified subject area. The tracking circuit 161 generates the distance information based on the parallax images, and uses the generated distance information when searching for the subject area. Details of a configuration and operation of the tracking circuit 161 will be described later.

An imaging lens 101 (lens unit) includes a fixed first-group lens 102, a zoom lens 111, an aperture 103, a fixed third-group lens 121, a focusing lens 131, a zoom motor 112, an aperture motor 104, and a focusing motor 132. The fixed first-group lens 102, the zoom lens 111, the aperture 103, the fixed third-group lens 121, and the focusing lens 131 constitute an imaging optical system. Note that, although the lenses 102, 111, 121, and 131 are each shown as one lens for convenience, these lenses may each be constituted by a plurality of lenses. The imaging lens 101 may be configured as a removable, interchangeable lens.

An aperture control circuit 105 controls operations of the aperture motor 104 for driving the aperture 103, and changes the diameter of the aperture 103.

A zoom control circuit 113 controls operations of the zoom motor 112 for driving the zoom lens 111, and changes the focal distance (angle of view) of the imaging lens 101.

A focus control circuit 133 calculates a defocus amount and a defocus direction of the imaging lens 101 based on a phase difference between a pair of focus detection signals (image A and image B), which are obtained from the image sensor 141. The focus control circuit 133 then converts the defocus amount and the defocus direction into a driving amount and a driving direction of the focusing motor 132. The focus control circuit 133 controls operations of the focusing motor 132 based on the driving amount and driving direction, and controls a focus state of the imaging lens 101 by driving the focusing lens 131. Thus, the focus control circuit 133 performs automatic focus detection (AF) using a phase-difference detection method. Note that, the focus control circuit 133 may execute AF using a contrast-detection method that is based on a contrast evaluation value obtained using image signals obtained from the image sensor 141.

A subject image formed on an image forming surface of the image sensor 141 by the imaging lens 101 is converted into an electrical signal (image signal) by a photoelectric conversion element provided in each of the plurality of pixels arranged in the image sensor 141. In this embodiment, in the image sensor 141, m pixels and n pixels (n and m are more than one) are arranged respectively in the horizontal direction and in the vertical direction in a matrix, and two photoelectric conversion elements (photoelectric conversion areas) are provided in each pixel. A sensor control circuit 143 controls readout of signals from the image sensor 141 in accordance with an instruction from the main control circuit 151.

Pixel Arrangement in Image Sensor 141

Figure 2:
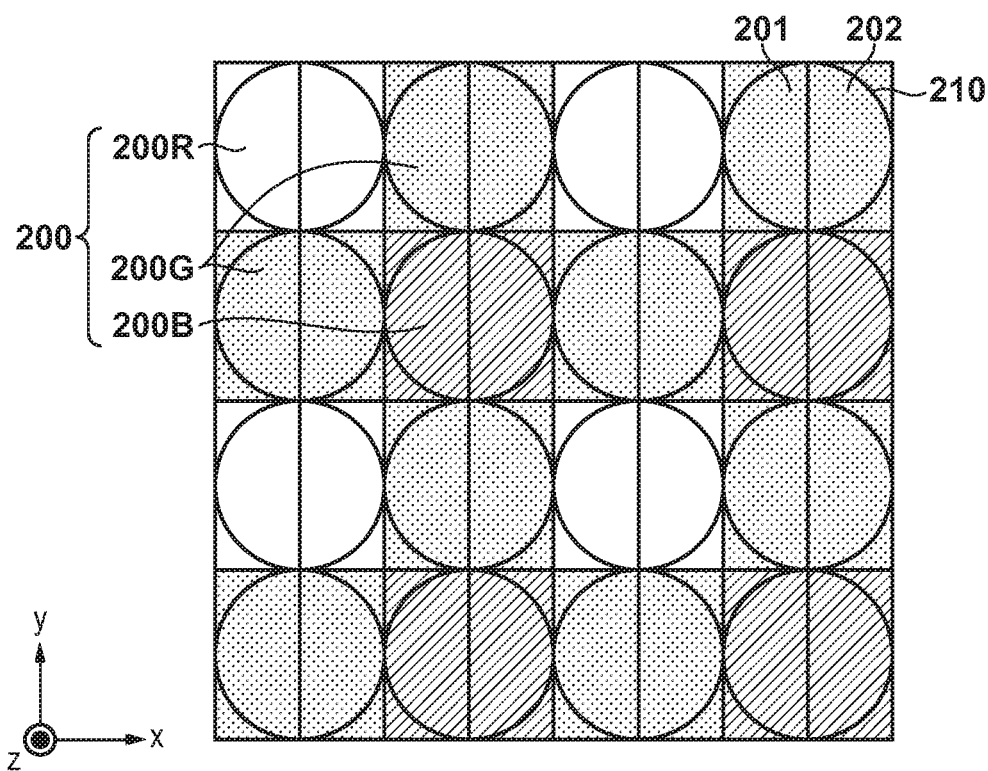
FIG. 2 is a diagram showing an exemplary pixel arrangement in an image sensor in FIG. 1.

FIG. 2 is a diagram schematically showing an exemplary pixel arrangement in the image sensor 141, and representatively shows an area that includes four pixels in the horizontal direction and four pixels in the vertical direction, i.e. a total of 16 pixels. Each pixel in the image sensor 141 is provided with one microlens 210 and two photoelectric conversion elements 201 and 202 that receive light via the microlens 210. In the example in FIG. 2, where the two photoelectric conversion elements 201 and 202 are arranged in the horizontal direction, each pixel has a function of dividing the pupil area in the imaging lens 101 in the horizontal direction.

The image sensor 141 is also provided with a color filter with a primary color Bayer arrangement, in which four pixels, namely two pixels in the horizontal direction x two pixels in the vertical direction are used as a repeating unit. The color filter is configured so that rows in which R (red) and G (green) are repeatedly arranged in the horizontal direction, and rows in which G and B (blue) are repeatedly arranged in the horizontal direction, are alternately arranged. A pixel 200R provided with an R (red) filter, a pixel 200G provided with a G (green) filter, and a pixel 200B provided with a B (blue) filter will be called a red pixel, a green pixel, and a blue pixel, respectively.

In some cases in the following description, a first photoelectric conversion element 201 and a second photoelectric conversion element 202 are called a pixel A and a pixel B, respectively, and a signal read out from the pixel A and a signal read out from the pixel B are called a signal A and a signal B, respectively. An image formed using signals A obtained from a plurality of pixels included in a certain area and an image formed using signals B obtained therefrom constitute a pair of parallax images. Accordingly, the digital camera 100 can generate two parallax images through a single capture. The same signal as a signal of a typical pixel that does not have a pupil division function can be obtained by adding the signal A and signal B of each pixel. In some cases in the following description, this added signal is called a signal A+B, and an image formed by the signal A+B is called a captured image.

Thus, it is possible to read out, from one pixel, three types of signals, namely the output of the first photoelectric conversion element 201 (signal A), the output of the second photoelectric conversion element 202 (signal B), and the output obtained by adding the output of the first photoelectric conversion element 201 and the output of the second photoelectric conversion element 202 (signal A+B). Note that, the signal A (signal B) may be obtained by subtracting the signal B (signal A) from the signal A+B, rather than by reading out the signal A (signal B).

Note that the photoelectric conversion elements may be arranged so as to be separated in the vertical direction, or there may be pixels with photoelectric conversion elements that are separated in different directions. Also, the photoelectric conversion elements may be separated in both the vertical and horizontal directions. Three or more photoelectric conversion elements may be separated in the same direction.

Returning to FIG. 1, an image signal read out from the image sensor 141 is supplied to a signal processing circuit 142. The signal processing circuit 142 applies signal processing, such as noise reduction processing, A/D conversion processing, and automatic gain control processing, to the image signal, and outputs the resulting signal to the sensor control circuit 143. The sensor control circuit 143 accumulates image signals received from the signal processing circuit 142 in a RAM (random access memory) 154.

The image processing circuit 152 applies predetermined image processing to image data accumulated in the RAM 154. Image processing applied by the image processing circuit 152 includes so-called development processing, such as white balance adjustment processing, color interpolation (demosaicing) processing, and gamma correction processing, as well as signal format conversion processing, scaling processing, subject detection processing, subject recognition processing, and the like, but is not limited thereto. Information regarding the brightness of a subject or the like to be used in automatic exposure (AE) control can also be generated by the image processing circuit 152. The results of subject detection processing and subject recognition processing may also be used in other image processing (e.g. white balance adjustment processing). Note that, in the case of performing AF using a contrast-detection method, the image processing circuit 152 may generate an AF evaluation value. The image processing circuit 152 saves processed image data in the RAM 154.

When the image data saved in the RAM 154 is to be recorded, the main control circuit 151 generates a data file that corresponds to the recording format by, for example, adding a given header to image-processed data. At this time, the main control circuit 151 causes a compression/decompression circuit 153 to encode the image data to compress the amount of information, as required. The main control circuit 151 records the generated data file in a recording medium 157, such as a memory card.

When the image data saved in the RAM 154 is to be displayed, the main control circuit 151 causes the image processing circuit 152 to scale the image data so that the size of the image data fits the display size of the display device 150, and thereafter writes the image data in an area (VRAM area) of the RAM 154 that is used as a video memory.

The display device 150 reads out image data to be displayed from the VRAM area of the RAM 154, and displays the read image data on a display panel, such as an LCD or an organic EL display.

When capturing a video (e.g. when in a capture-standby state or while recording a video), the digital camera 100 according to this embodiment causes the display device 150 to function as an electronic view finder (EVF) by displaying the captured video in real time on the display device 150. A video displayed when the display device 150 is caused to function as an EVF and a frame image thereof will be called live view images or through-the-lens images.

When a still image has been captured, the digital camera 100 displays the still image that has just been captured, on the display device 150 for a fixed time so that the user can check the result of image capture. These display operations are also realized by the control performed by the main control circuit 151.

An operation member 156 includes switches, buttons, keys, a touch panel, and the like for allowing the user to input instructions to the digital camera 100. Input made through the operation member 156 is detected by the main control circuit 151 via the bus 160, and the main control circuit 151 controls circuits and/or devices to realize an operation that corresponds to the input.

For example, the main control circuit 151, which has one or more programmable processors, such as CPUs or MPUs, loads a program stored in a storage device 155 into the RAM 154 and executes the loaded program to control the respective circuits and/or devices, thereby realizing the functions of the digital camera 100. The main control circuit 151 also executes AE processing to automatically determine exposure conditions (shutter speed or accumulation time, f-number, sensitivity) based on information regarding the brightness of the subject. The information regarding the brightness of the subject can be acquired from the image processing circuit 152, for example. The main control circuit 151 can also determine the exposure conditions with an area of a specific subject, such as the face of a person, as a reference.

The main control circuit 151 fixes the aperture when capturing a video, and controls the exposure through the electronic shutter speed (accumulation time) and the gain value. The main control circuit 151 notifies the sensor control circuit 143 of the determined accumulation time and gain value. The sensor control circuit 143 controls operations of the image sensor 141 so that an image is captured in accordance with the exposure conditions of which the sensor control circuit 143 was notified.

Note that, in this embodiment, a pair of parallax images and a captured image, i.e. a total of three images can be acquired through a single capture, and the image processing circuit 152 processes the respective images and writes the processed images in the RAM 154. The tracking circuit 161 obtains the subject distance information based on the pair of parallax images, and uses the obtained subject distance information in subject tracking processing for a captured image. If subject tracking is successful, the tracking circuit 161 outputs information regarding the position of a subject area in the captured image and information regarding the reliability thereof.

The subject tracking result can be used in automatic setting of a focus detection area, for example. As a result, a tracking AF function for a specific subject area can be realized. It is also possible to perform AF processing based on brightness information regarding a focus detection area, and to perform image processing (e.g. gamma correction processing, white balance adjustment processing etc.) based on pixel values in the focus detection area. Note that, the main control circuit 151 may perform display so as to overlap an index (e.g. a rectangular frame that surrounds an area) for indicating a current subject area position on a displayed image.

A battery 159 is managed by a power management circuit 158, and supplies power to the entire digital camera 100.

The storage device 155 stores programs to be executed by the main control circuit 151, set values required for executing the programs, GUI data, user-set values, or the like. For example, upon an instruction to shift a power-off state to a power-on state being made through an operation to the operation member 156, a program stored in the storage device 155 is loaded into a portion of the RAM 154, and the main control circuit 151 executes the program.

Configuration and Operation of Tracking Circuit

Figure 3:
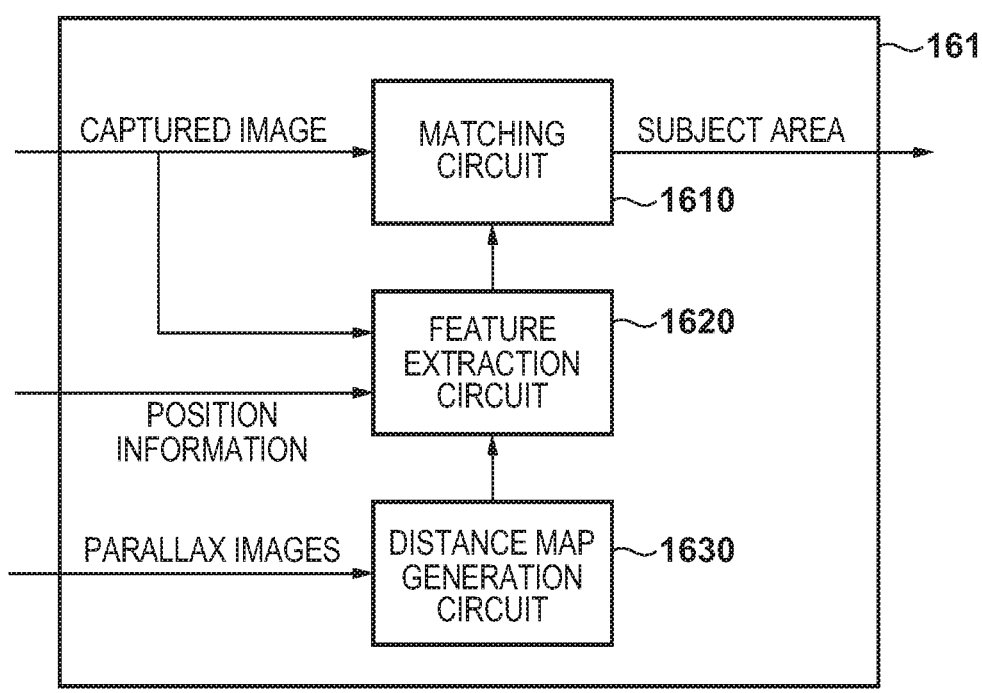
FIG. 3 is a block diagram showing an exemplary functional configuration of a tracking circuit in FIG. 1.

FIG. 3 is a block diagram showing an exemplary functional configuration of the tracking circuit 161. The tracking circuit 161 includes a matching circuit 1610, a feature extraction circuit 1620, and a distance map generation circuit 1630. The tracking circuit 161 identifies an image area (subject area) to track, based on the specified position, and extracts a feature amount from the subject area. The tracking circuit 161 then uses the extracted feature amount to search individual supplied captured images for a subject area, which is an area whose degree of similarity to the subject area in the previous frame is high. The tracking circuit 161 also acquires the distance information from the pair of parallax images, and uses the acquired distance information in identifying the subject area.

The matching circuit 1610 searches for the subject area in the supplied image, using the feature amount of the subject area supplied from the feature extraction circuit 1620. Although the method to search for an area based on a feature amount of an image is not particularly limited, the matching circuit 1610 uses at least one of template matching and histogram matching.

Template matching and histogram matching will now be described.

Template matching is a technique with which a pixel pattern is set as a template, and an image is searched for an area whose degree of similarity to the template is highest. As a degree of similarity between the template and the image area, a correlation amount, such as the sum of absolute differences between corresponding pixels, can be used.

Figure 4A:
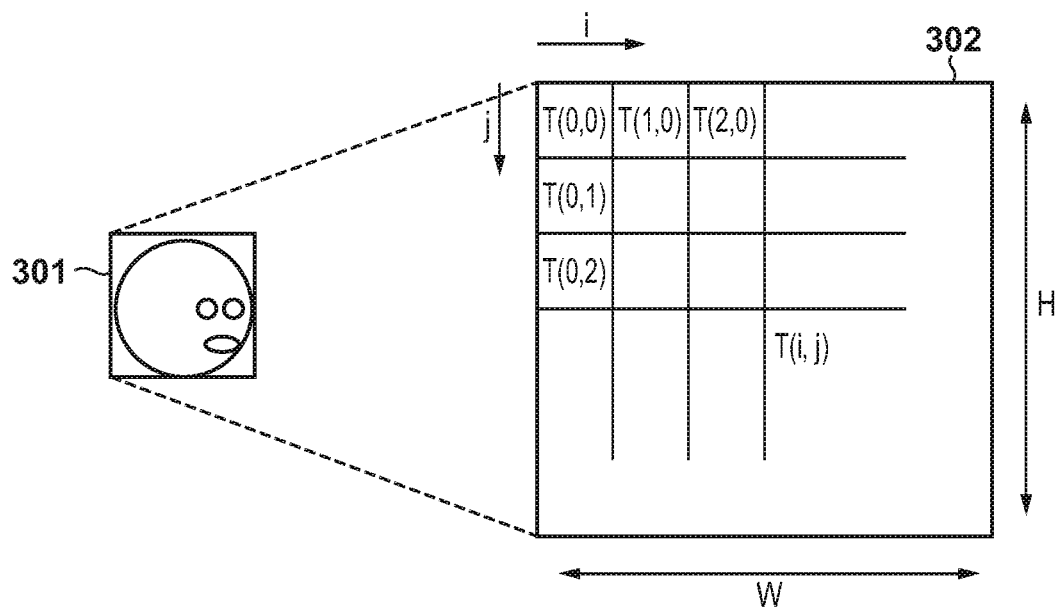
FIGS. 4A and 4B are diagrams related to template matching according to the embodiments.

FIG. 4A schematically shows a template 301 and an exemplary configuration 302 thereof. When template matching is performed, information regarding colors (hue) to be used in a template is supplied as a feature amount from the feature extraction circuit 1620 to the matching circuit 1610. Here, the template 301 has a size of W pixels in the horizontal direction and H pixels in the vertical direction, and binarization is performed to replace a pixel that matches the feature amount and a pixel that does not match the feature amount with respective fixed values. The matching circuit 1610 performs pattern matching using the template 301, which is binarized.

Accordingly, when coordinates in the template 301 are expressed in a coordinate system shown in FIG. 4A, a feature amount T(i, j) of the template 301 used in pattern matching can be expressed as Equation (1) below.

$$T(i,j)=\{T(0,0),T(1,0),\ldots,T(W-1,H-1)\} \quad (1)$$

Figure 4B:
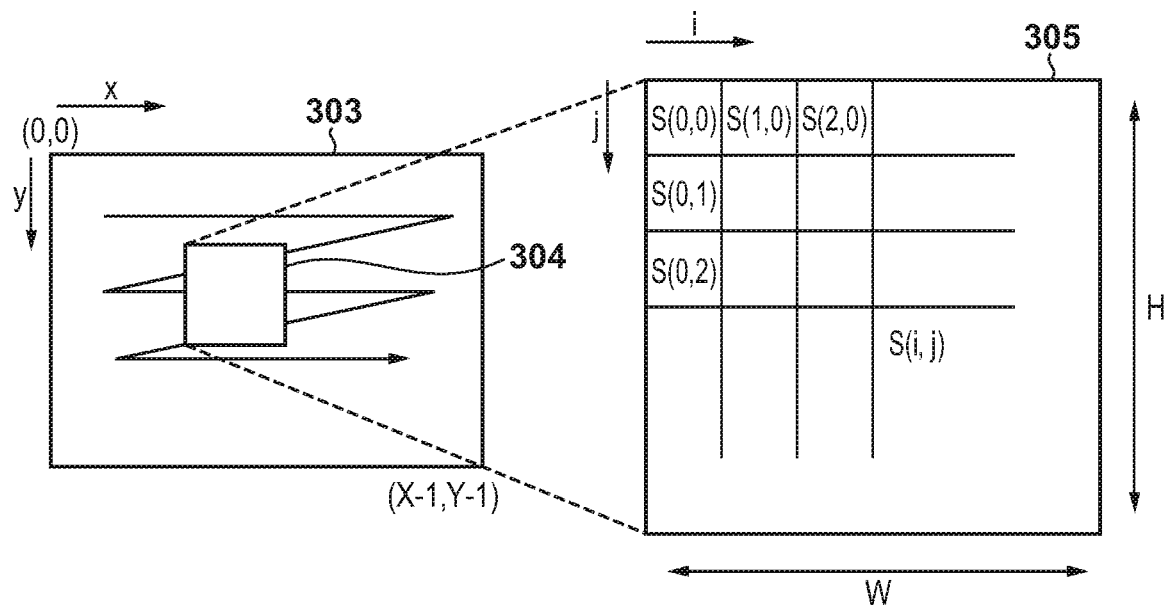

FIG. 4B shows an example of a search area 303 in the subject area and a configuration 305 thereof. The search area 303 is an area in which pattern matching is performed within an image, and may be the entire image or a portion thereof. The coordinates in the search area 303 are expressed as (x, y). In the search area 303 as well, binarization is performed to replace a pixel that matches the feature amount and a pixel that does not match the feature amount with respective fixed values. The area 304 has the same size as that of the template 301, namely the size of W pixels in the horizontal direction and H pixels in the vertical direction, and is subjected to calculation of the degree of similarity to the template 301.

If coordinates in the template 301 are expressed as a coordinate system shown in FIG. 4B, a feature amount S(i, j) of the area 304 used in pattern matching can be expressed as Equation (2) below.

$$S(i,j)=\{S(0,0),S(1,0),\ldots,S(W-1,H-1)\} \quad (2)$$

The matching circuit 1610 calculates the value of the sum of absolute differences (SAD) indicated by Equation (3) below, with an evaluation value indicating the similarity between the template 301 and the area 304 as V(x, y).

$$V(x,y) = \sum_{j=0}^{H-1}\sum_{i=0}^{W-1} |T(i,j) - S(i,j)| \quad (3)$$

Here, V(x, y) indicates the evaluation value at the coordinates (x, y) at the upper left vertex of the area 304.

The matching circuit 1610 calculates the evaluation value V(x, y) at each position while rightwardly shifting the area 304 by one pixel at a time from the upper left of the search area 303 and, after the area 304 reaches x=(X−1)−(W−1), downwardly shifting the area 304 by one pixel and setting x=0. The coordinates (x, y) at which the calculated evaluation value V(x, y) is smallest indicate the position of the area 304 having a pixel pattern that is most similar to that of the template 301. The matching circuit 1610 detects the area 304 in which the evaluation value V(x, y) is smallest, as the subject area that is present in the search area. Note that, if the reliability of the search result is low (e.g. if the smallest value of the evaluation value V(x, y) exceeds a threshold value), it may be determined that the subject area was not found.

In this example of pattern matching, a template is used in which pixels are binarized in accordance with whether the color thereof is any of the colors that correspond to the feature amount, whereas a template may be used in which pixels are multi-valued so as to correspond to respective colors included in the feature amount. A feature amount that is based on the lightness or saturation may be used in place of a feature amount of color. Although an example of using an SAD as an evaluation value for the degree of similarity has been described, other evaluation values, such as NCC (Normalized Cross-Correlation) or ZNCC, may alternatively be used.

Next, details of histogram matching will be described.

Figure 5A:
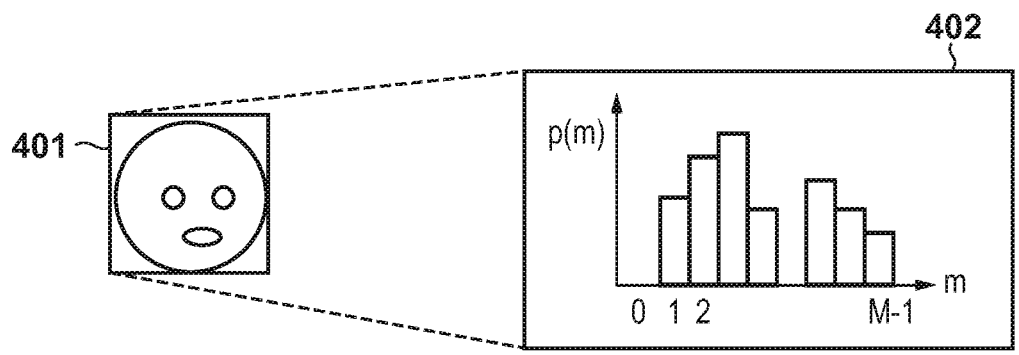
FIGS. 5A and 5B are diagrams related to histogram matching according to the embodiments.

FIG. 5A shows an example of a subject area 401 and a histogram 402 thereof. When histogram matching is performed, information regarding colors (hue) to be used in a color histogram is supplied as a feature amount from the feature extraction circuit 1620 to the matching circuit 1610. Assuming that the number of bins in the color histogram is M (M is an integer of 2 or more), a color histogram p(m) 402 generated by the matching circuit 1620 can be expressed as Equation (4) below.

$$p(m)=\{p(0),p(1),\ldots,p(M-1)\} \quad (4)$$

Note that p(m) is a normalized histogram. This color histogram p(m) has only bins that correspond to colors included in the feature amount. That is to say, if the number of bins is M, the number of colors supplied as the feature amount is also M.

Figure 5B:
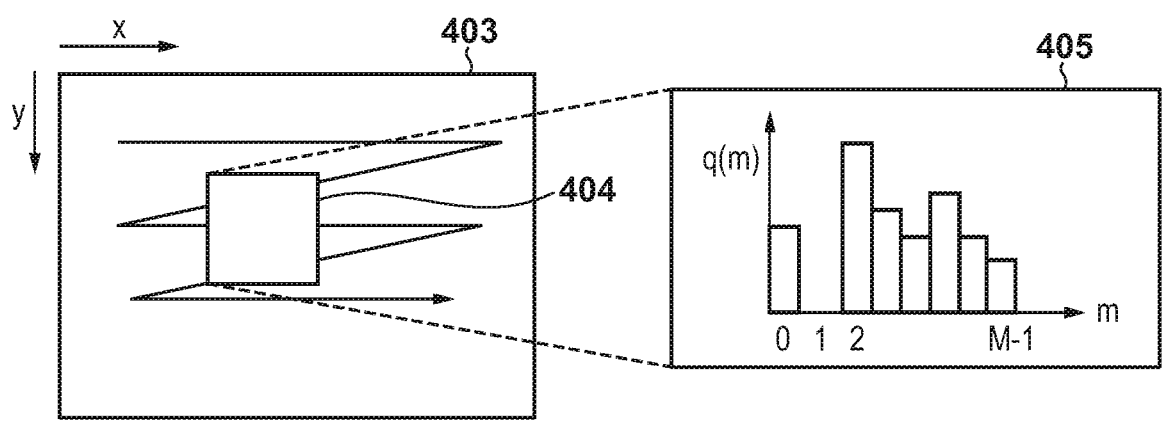

FIG. 5B shows an example of a search area 403 in the subject area and a color histogram 405 thereof. A color histogram q(m) 405 of the area 404 is expressed as Equation (5) below, with the number of bins being M.

$$q(m)=\{q(0),q(1),\ldots,q(M-1)\} \quad (5)$$

Note that q(m) is a normalized histogram. This color histogram q(m) also has only bins that correspond to colors included in the feature amount.

The tracking circuit 161 can calculate a Bhattacharyya coefficient, which is indicated by Equation (6) below, as an evaluation value D(x, y) of the similarity between the brightness histogram p(m) of the subject area 401 and the brightness histogram q(m) of the area 404.

$$D(x,y) = \sum_{m=0}^{M-1} \sqrt{p(m) \times q(m)} \quad (6)$$

Here, D(x, y) indicates the evaluation value at the coordinates (x, y) at the upper left vertex of the area 404.

The matching circuit 1610 calculates the evaluation value D(x, y) while shifting the area 404 within the search area 403, similar to template matching. The coordinates (x, y) at which the calculated evaluation value D(x, y) is largest indicate the position of the area 404 that is most similar to the subject area 401. The matching circuit 1610 detects the area 404 in which the evaluation value D(x, y) is largest, as the subject area that is present in the search area.

Although an example of using a feature amount of colors (hue) in histogram matching has been described here, a feature amount of lightness or saturation may alternatively be used. Although an example of using a Bhattacharyya coefficient as an evaluation value for the degree of similarity has been described, other evaluation values, such as a histogram intersection, may alternatively be used.

The distance map generation circuit 1630 calculates the subject distance based on the pair of parallax images, and generates a distance map. The distance map is a kind of distance information in which each pixel represents a subject distance, and is also called a depth map, a depth image, or a distance image. Note that the distance map may be generated without using the parallax images. For example, the subject distance at each pixel may be acquired by obtaining, for each pixel, the position of the focusing lens 131 at which a contrast evaluation value is at the maximum value, and the distance image may be generated using this subject distance.

Figure 6:
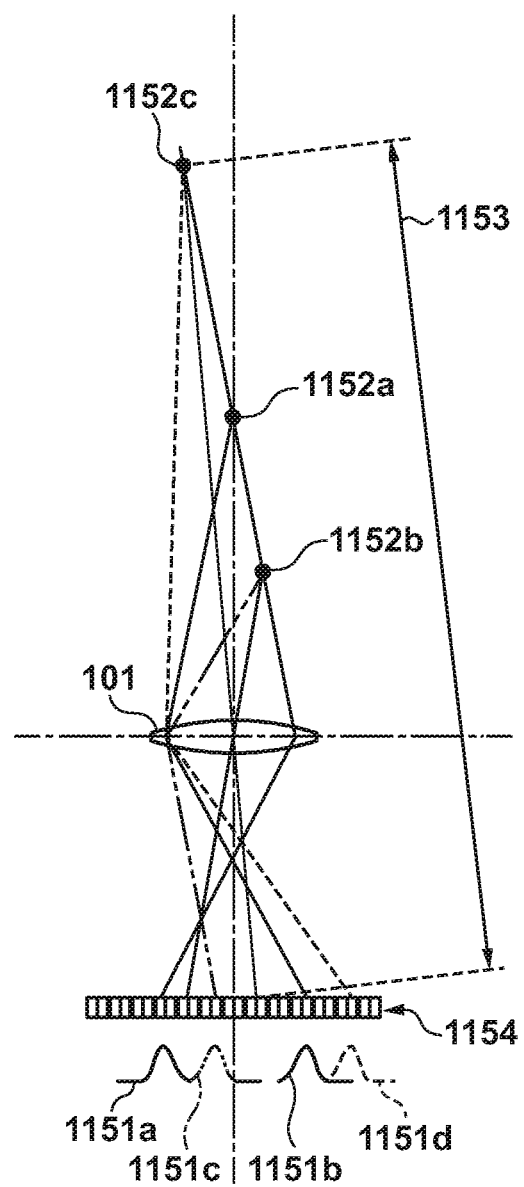
FIG. 6 is a diagram related to a method to acquire a subject distance according to the embodiments.

A method to calculate the subject distance will be described using FIG. 6. In FIG. 6, assuming that an image A 1151a and an image B 1151b have been obtained, it can be found that a light beam is refracted as indicated by solid lines, based on the focal length of the imaging lens 101 and information regarding the distance between the focusing lens 131 and the image sensor 141. Accordingly, it can be found that a subject that comes into focus is at a position 1152*a*. Similarly, it can be found that a subject that comes into focus is at a position 1152*b* when an image B 1151*c* is obtained with respect to the image A 1151*a*, and is at a position 1152*c* when an image B 1151*d* is obtained with respect thereto. As described above, it is possible to calculate, at each pixel, the distance information regarding the subject at the position of this pixel, based on the relative positions of an image A that includes this pixel, and a corresponding image B.

For example, it is assumed in FIG. 6 that the image A 1151*a* and the image B 1151*d* have been obtained. In this case, a distance 1153 from a pixel 1154 at a midpoint that corresponds to half of the shift amount of the image to the subject position 1152*c*, or a defocus amount that corresponds to the distance 1153 is stored as the pixel value of the pixel 1154. Thus, it is possible to calculate the subject distance information for each pixel and generate the distance map.

Note that, the distance map may be generated by dividing an image into small areas and calculating a defocus amount for each small area. An image A and an image B may be generated using pixels included in each small area, and a phase difference (image shift amount) therebetween may be detected through correlation calculation and converted into a defocus amount. In this case as well, each pixel in the generated distance map also indicates a subject distance, but pixels included in a small area indicate the same subject distance. The distance map generation circuit 1630 supplies the generated distance map to the feature extraction circuit 1620.

Note that, although the distance map may be generated for the entire image, the distance map may alternatively be generated for only a partial area that has been specified to extract a feature amount.

The feature extraction circuit 1620 extracts, from the subject area, the feature amount to be used to track (search for) the subject area.

When subject tracking is executed, usually a user is prompted to specify a position in an image that is to be tracked, before tracking starts. For example, when in a capture-standby state, the user can be prompted to specify, through the operation member 156, a position in the image displayed on the display device 150. For example, if the display device 150 is a touch display, the main control circuit 151 acquires the coordinates of the position tapped, or the coordinates of the position specified by a cursor that can be moved on the image through an operation made to the operation member 156. Information regarding the specified position is input from the main control circuit 151 to the feature extraction circuit 1620.

Figure 7C:
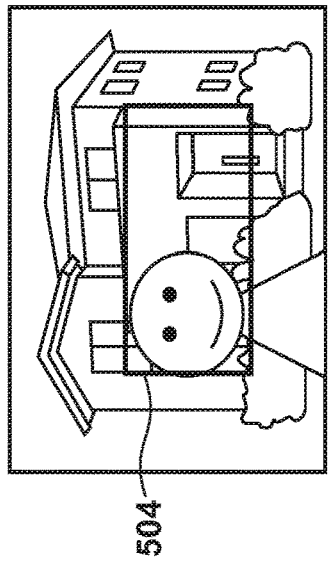
FIGS. 7A to 7F are diagrams schematically showing a method to identify a subject area according to the embodiments.
Figure 7B:
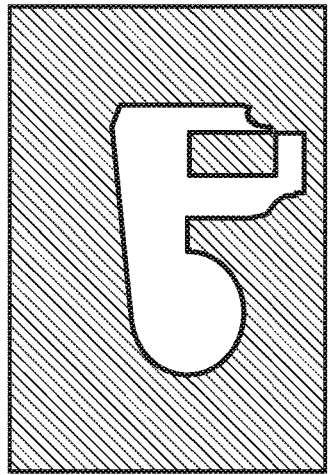
Figure 7A:
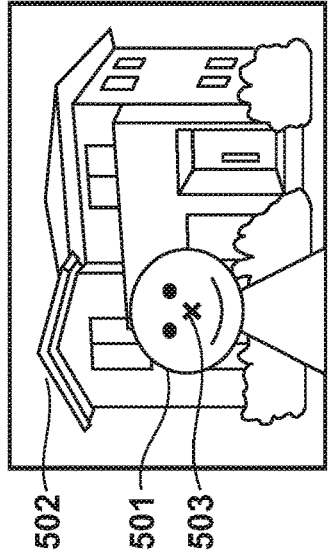

A description will now be given, with reference to FIGS. 7A to 7F, of a method by which the feature extraction circuit 1620 identifies the subject area whose feature amount is to be extracted. FIG. 7A shows a captured image, and a specified position 503 indicates coordinates within the face 501 of a person. It is assumed that a house 502, which is the background, has color information similar to that of the face 501 of the person.

The feature extraction circuit 1620 generates a color histogram $H_{in}$ in the subject area, while assuming that a given area that includes the specified position 503, e.g. a given rectangular area with the specified position 503 as the center, is a provisional subject area. The feature extraction circuit 1620 also sets all of the area excluding the provisional subject area as a reference area, and generates a color histogram $H_{out}$ regarding this reference area. The color histogram indicates the frequency of colors included in the image, and it is assumed here, as an example, that a pixel value of the RGB color space is converted into a pixel value of the HSV color space, and a color histogram regarding hue (H) is generated. However, any other type of color histogram may be generated.

The feature extraction circuit 1620 then calculates the amount of information I(a), which is expressed as Equation (7) below.

$$I(a) = -\log_2(H_{in}(a)/H_{out}(a)) \quad (7)$$

Here, a is an integer that indicates a bin number. The greater the proportion of the number of pixels of the color that corresponds to the bin included in the provisional subject area to the number of pixels of the color that corresponds to this bin included in the reference area, the smaller the absolute value of the amount of information I(a). That is to say, it is conceivable that the smaller the value of this amount of information I(a), the proportion of the pixels of the color that corresponds to the amount of information I(a) included in the provisional subject area is greater than that of the pixels of this color included in the reference area, and it is likely that this color is a color characteristic of the provisional subject area. The feature extraction circuit 1620 calculates the amount of information I(a) for all bins.

The feature extraction circuit 1620 replaces each of the calculated amounts of information I(a) with a value in a specific range (e.g. in the range of 8-bit values (0 to 255)). At this time, the feature extraction circuit 1620 replaces a smaller value of the amount of information I(a) with a greater value. The feature extraction circuit 1620 then replaces the value of each pixel included in the captured image with the value with which the amount of information I(a) that corresponds to the color of this pixel has been replaced.

The feature extraction circuit 1620 generates a subject map that is based on color information through the above processing. FIG. 7B shows an example of the subject map, in which a pixel whose color is closer to white has a greater probability of being a pixel that corresponds to the subject, and in which a pixel whose color is closer to black has a lower probability of being a pixel that corresponds to the subject. Note that, although the subject map is shown as a binary image in FIG. 7B for convenience, the subject map actually is a gradation image. Since a portion of the house 502, which is the background in the captured image, has a similar color to the color of the face 501 of the person, the face 501 of the person cannot be sufficiently discriminated using a subject map that is based on color information. A rectangular area 504 shown in FIG. 7C shows an example of a subject area that is ultimately set (updated) based on an area in which pixel values in the subject map are greater than or equal to a given threshold value.

Figure 7F:
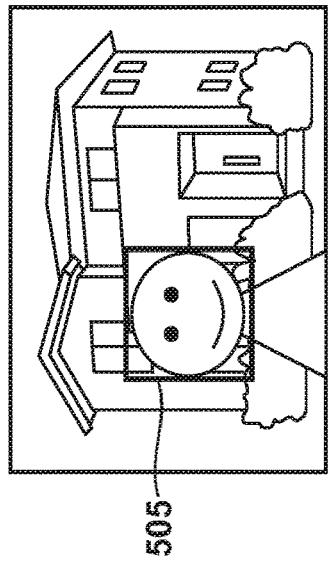
Figure 7E:
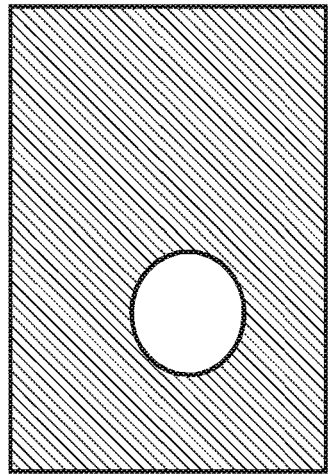
Figure 7D:
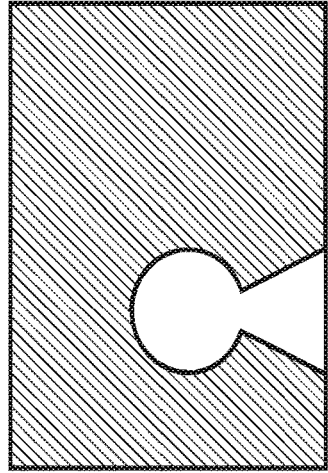

If a feature amount extracted from this subject area is used, the face 501 of the person is less likely to be able to be accurately tracked. For this reason, in this embodiment, the distance map generated by the distance map generation circuit 1630 is used in order to improve the accuracy of the subject area that is set based on the color information. FIG. 7D shows an example in which the distance map generated for the captured image shown in FIG. 7A has been converted so that, with the subject distance that corresponds to the specified position 503 as a reference, pixels at which the difference in the subject distance is smaller appear brighter, and pixels at which the difference is greater appear darker.

Note that, although the distance map is shown as a binary image in FIG. 7D for convenience, the distance map actually is a gradation image.

The feature extraction circuit 1620 generates a subject map in which the distance information is given consideration by, for example, multiplying corresponding pixel values in the distance map and in the subject map that is based on the color information. FIG. 7E shows an example of a subject map in which the distance information is given consideration (i.e. that is based on both the color information and the distance information). In the subject map shown in FIG. 7E, the face 501 of the person is accurately distinguished from the house 502 that is the background. A rectangular area 505 shown in FIG. 7F is an example of a subject area that is set based on an area in which pixel values are greater than or equal to a given threshold value in the subject map shown in FIG. 7E, for example. The rectangular area 505 is a rectangular area that circumscribes the face 501 of the person, and only a very small number of pixels that correspond to the background is included in this area. If a feature amount extracted from this subject area is used, the face 501 of the person is more likely to be able to be accurately tracked.

As a result of thus referencing the distance information in addition to the color information regarding a given area that includes the specified position, a more accurate subject area can be set, making it possible to extract a feature amount that is suitable for accurate tracking.

Note that there are also cases where valid distance information (that is sufficiently reliable for reference) has not been obtained regarding the specified position and a nearby area at the time point when the position to be tracked is specified. For example, there may be the case where the distance map has been generated only for a specific area (e.g. focus detection area), and the specified position is out of that specific area, or the case where the specified position has not been brought into focus, and the reliability of the distance information is low.

For this reason, if the distance information regarding a nearby area of the specified position (provisional subject area) that is sufficiently reliable for reference has been obtained, the feature extraction circuit 1620 references the distance information in addition to the color information to set the subject area. On the other hand, if the distance information regarding a nearby area of the specified position (provisional subject area) that is sufficiently reliable for reference has been not been obtained, the feature extraction circuit 1620 does not reference the distance information, and sets the subject area based on the color information. Note that the distance information that is sufficiently reliable for reference may be, for example, distance information that is obtained when the provisional subject area is in an in-focus state or almost in-focus state (i.e. in a state where the defocus amount is smaller than or equal to a given threshold value), but is not limited thereto.

Processing Flow in Image Capture Apparatus

A description will be given, using the flowcharts in FIGS. 8 and 9, of a video capture operation involving subject tracking processing performed by the digital camera 100 according to this embodiment. The video capture operation is executed when in a capture-standby state or when a video is recorded. Note that, although details, such as the resolution of images (frames) to be handled, are different between those during a capture-standby state and those when a video is being recorded, the content of processing for subject tracking is basically the same, and the following description accordingly does not particularly distinguish between such differences.

In step S801, the main control circuit 151 determines whether the power of the digital camera 100 is ON, ends the processing if it is not determined that the power is ON, and advances the processing to step S802 if it is determined that the power is ON.

In step S802, the main control circuit 151 controls respective circuits and/or devices to execute image capture processing for one frame, and advances the processing to step S803. Note that, here, a pair of parallax images and a captured image for one screen are generated and stored in the RAM 154.

In step S803, the main control circuit 151 causes the tracking circuit 161 to execute subject tracking processing. Details of the processing will be described later. Note that the tracking circuit 161 notifies the main control circuit 151 of the position and size of the subject area through subject tracking processing. The main control circuit 151 sets a focus detection area based on the subject area of which it was notified.

In step S804, the main control circuit 151 causes the focus control circuit 133 to execute focus detection processing. The focus control circuit 133 generates an image A by combining a plurality of signals A obtained from a plurality of pixels arranged in the same row among a plurality of pixels included in the focus detection area in the pair of parallax images, and generates an image B by combining a plurality of signals B. The focus control circuit 133 then calculates a correlation amount between the image A and the image B while shifting the relative position of the image A and image B, and obtains, as a phase difference (shift amount) between the image A and image B, the relative position at which the degree of similarity between the image A and image B is highest. Furthermore, the focus control circuit 133 converts the phase difference into a defocus amount and a defocus direction.

In step S805, the focus control circuit 133 drives the focusing motor 132 in accordance with a lens driving amount and a driving direction that correspond to the defocus amount and defocus direction obtained in step S804, thus moves the focusing lens 131, and returns the processing to step S801.

Thereafter, processing in steps S801 to S805 is repeatedly executed until it is no longer determined in step S801 that the power switch is ON. Thus, a plurality of time-series images are searched for the subject area, and the subject tracking function is realized. Note that, although it is assumed in FIG. 8 that subject tracking processing is executed for each frame, the processing may be performed for every several frames, for the purpose of reducing the processing load and power consumption.

Subject Tracking Processing

Next, the details of subject tracking processing in step S803 will be described using the flowchart in FIG. 9.

In step S901, the tracking circuit 161 determines whether an instruction to start subject tracking has been detected, advances the processing to step S902 if it is determined that a start instruction has been detected, and advances the processing to step S906 if not. Note that the start instruction may be the input to specify the tracking position from the operation member 156, for example. The tracking circuit 161 is notified of information regarding the specified position by the main control circuit 151. At this time point, it is likely that the distance information regarding the specified position has not been obtained, or the reliability of the distance information is low since the specified position is not in focus. For this reason, the content of processing is differentiated from that of processing performed after focus detection processing has been performed for the specified position.

In step S902, the tracking circuit 161 (feature extraction circuit 1620) determines whether valid (reliable) distance information has been obtained for the specified position and the nearby area thereof, advances the processing to step S904 if it is determined that valid distance information has been obtained, and advances the processing to step S903 if it is not determined that valid distance information has been obtained.

In step S903, the tracking circuit 161 (feature extraction circuit 1620) identifies the subject area based on the specified position using only the color information, as mentioned above, extracts a feature amount of the subject area, and advances the processing to step S905.

In step S904, the tracking circuit 161 (feature extraction circuit 1620) identifies the subject area based on the specified position using both the color information and the distance information, as mentioned above, extracts a feature amount (pixel pattern or histogram) of the subject area, and advances the processing to step S905.

In step S905, the tracking circuit 161 (matching circuit 1610) performs matching processing on the search area in the captured image using the feature amount extracted in step S903 or S904, and searches for an area in which the degree of similarity to the feature amount is highest. The tracking circuit 161 notifies the main control circuit 151 of information regarding the position and size of the searched area as the tracking result, and ends tracking processing.

On the other hand, in step S906, the tracking circuit 161 (feature extraction circuit 1620) determines whether the immediately previously extracted feature amount has been extracted from the subject area that was identified using both the color information and distance information. The tracking circuit 161 (feature extraction circuit 1620) advances the processing to step S905 if it is determined that the immediately previously extracted feature amount has been extracted from the subject area that was identified using both the color information and distance information, and advances the processing to step S907 if not.

In step S907, the tracking circuit 161 (feature extraction circuit 1620) determines whether valid distance information regarding the subject area that was detected through the previous matching has been obtained, advances the processing to step S908 if it is determined that valid distance information has been obtained, and advances the processing to step S905 if it is not determined that valid distance information has been obtained.

In step S908, the tracking circuit 161 (feature extraction circuit 1620) re-identifies (updates) the subject area based on the specified position using both the color information and the distance information, as in step S904, extracts a feature amount of the updated subject area, and advances the processing to step S905. Note that a previously extracted feature amount (e.g. extracted through processing in step S903 that was performed immediately previously) may be considered in addition to the feature amount extracted in step S908.

In matching processing executed in step S905 during continuous processing, an updated feature amount is used if the feature amount was updated in step S908, and the immediately previously extracted feature amount continues to be used if the feature amount was not updated in step S908.

For example, even if focus detection processing for the subject area detected through the previous matching has started, if the defocus amount is not yet smaller than or equal to a given threshold value, the reliability of the distance information cannot be considered to be high. In this case, processing is performed in the order of S901, S906, S907, and S905.

If the defocus amount of the tracked subject area is smaller than or equal to a given threshold value, reliable distance information regarding the subject area can be acquired. In this case, processing is performed in the order of S901, S906, S907, S908, and S905.

If the subject area has come to be identified using not only the color information but also reliable distance information, then the subject area and feature amount are updated, and the updated feature amount is used in subsequent tracking processing. In this case, processing is performed in the order of S901, S906, and S905.

As described above, according to this embodiment, when an image area (subject area) to be tracked is identified based on a specified position in an image, the accuracy of the subject area can be improved by using the distance information in addition to the color information regarding the image. For this reason, the accuracy of tracking processing using a feature amount extracted from the subject area can be improved.

In the case where the reliability of the distance information is not high, the subject area is identified based on the color information until the reliability of the distance information increases, and the subject area is again re-identified (updated) by also using the distance information at the time point when reliable distance information has become obtainable. For this reason, even if a position at which the distance information has not been obtained or a position at which the reliability of the distance information is low is specified as a tracking target, the accuracy of tracking processing can be increased over time.

Second Embodiment

In the first embodiment, if the feature amount can be extracted from a subject area identified based on reliable distance information and the color information, the feature amount is not updated. Thus, subject tracking that is resistant to occlusion can be realized while avoiding the accumulation of drift errors. On the other hand, if the brightness or hue of the subject has changed from when the feature amount was extracted, e.g. if the environment where the subject is present has changed, the subject tracking accuracy may worsen.

For this reason, in this embodiment, if the difference in the distance information between the subject area and a peripheral area satisfies given conditions, a feature amount that was extracted using reliable distance information is also updated. Note that, since this embodiment can be implemented with the digital camera 100 having the configuration in FIG. 1, as in the first embodiment, the following description will mainly focus on differences in operation from the first embodiment.

A description will be given, using the flowchart in FIG. 10, of a video capture operation involving subject tracking processing performed by the digital camera 100 according to this embodiment.

Figure 8:
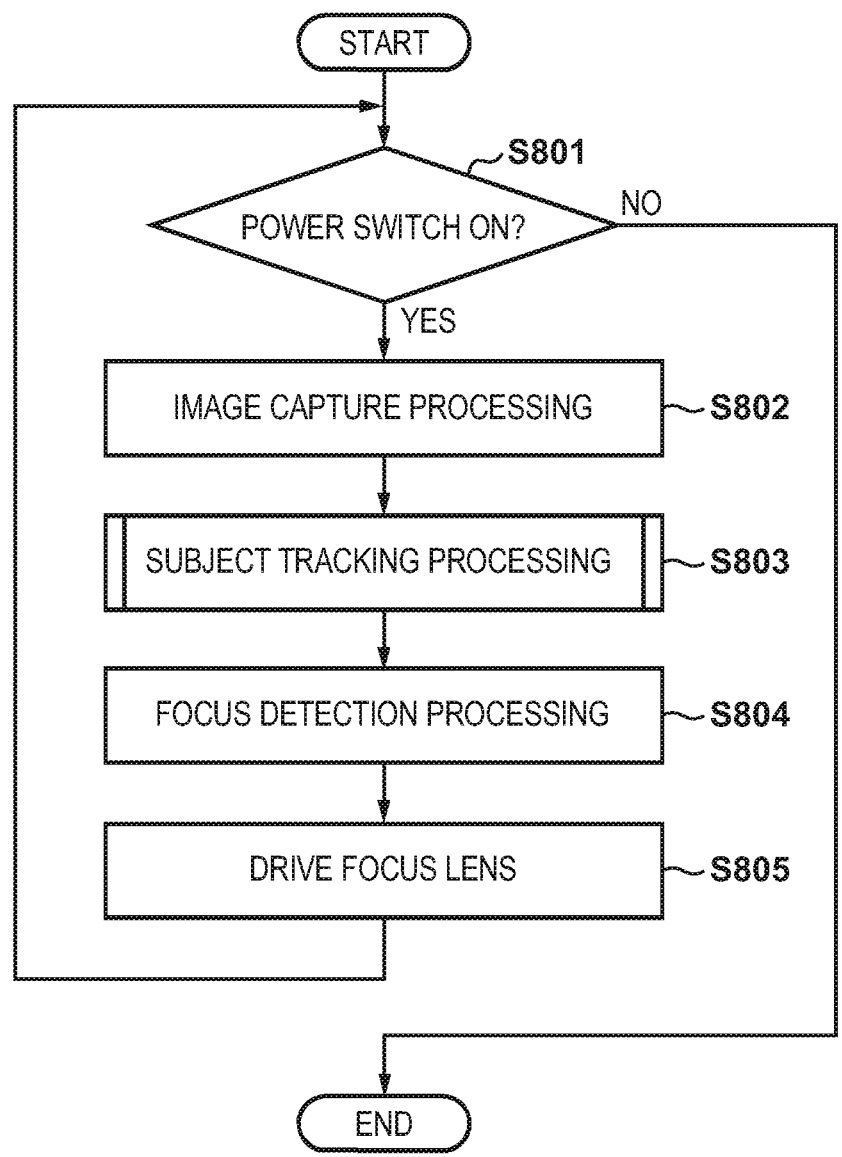
FIG. 8 is a flowchart of image capture processing according to a first embodiment.
Figure 9:
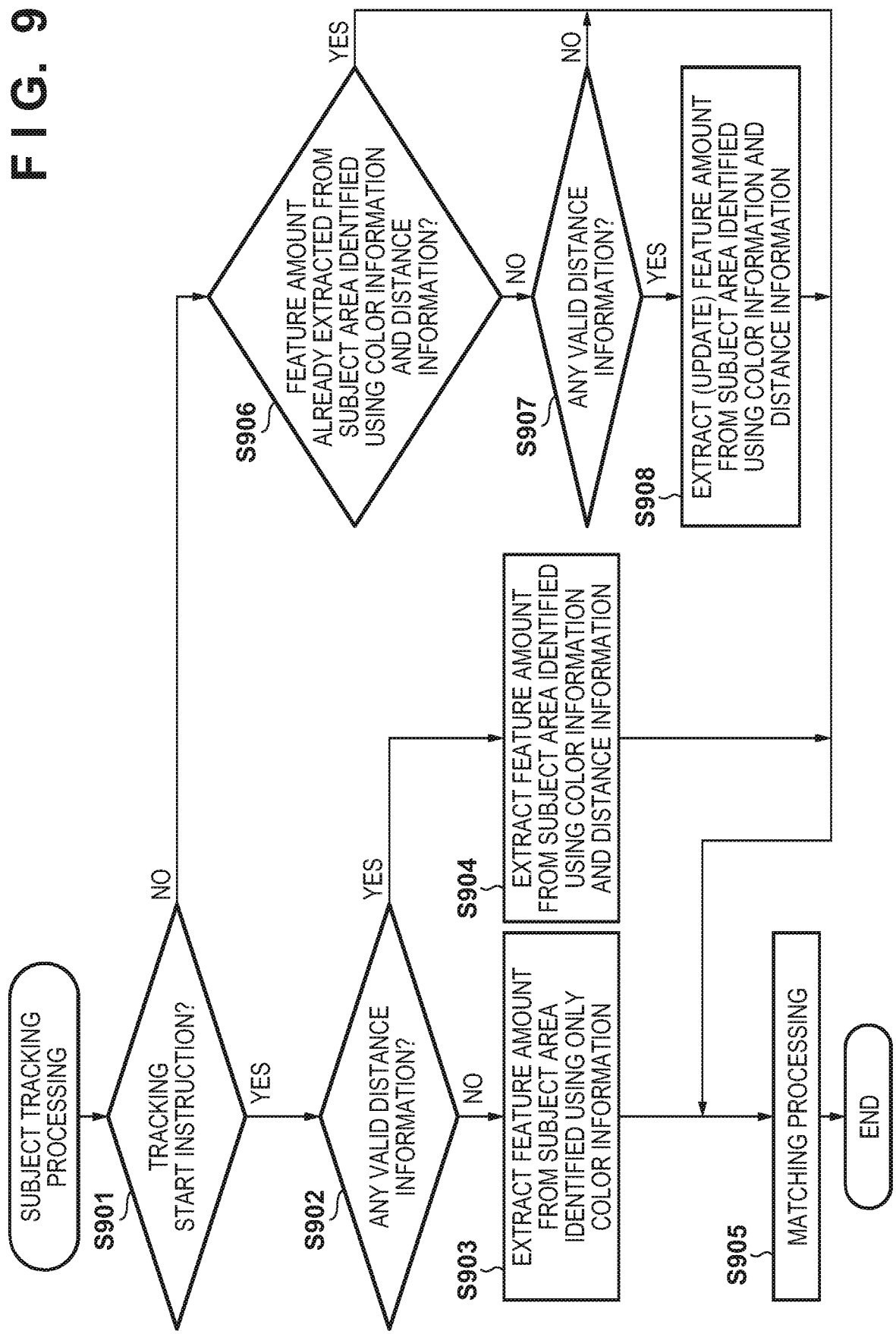
FIG. 9 is a flowchart of subject tracking processing according to the first embodiment.
Figure 10:
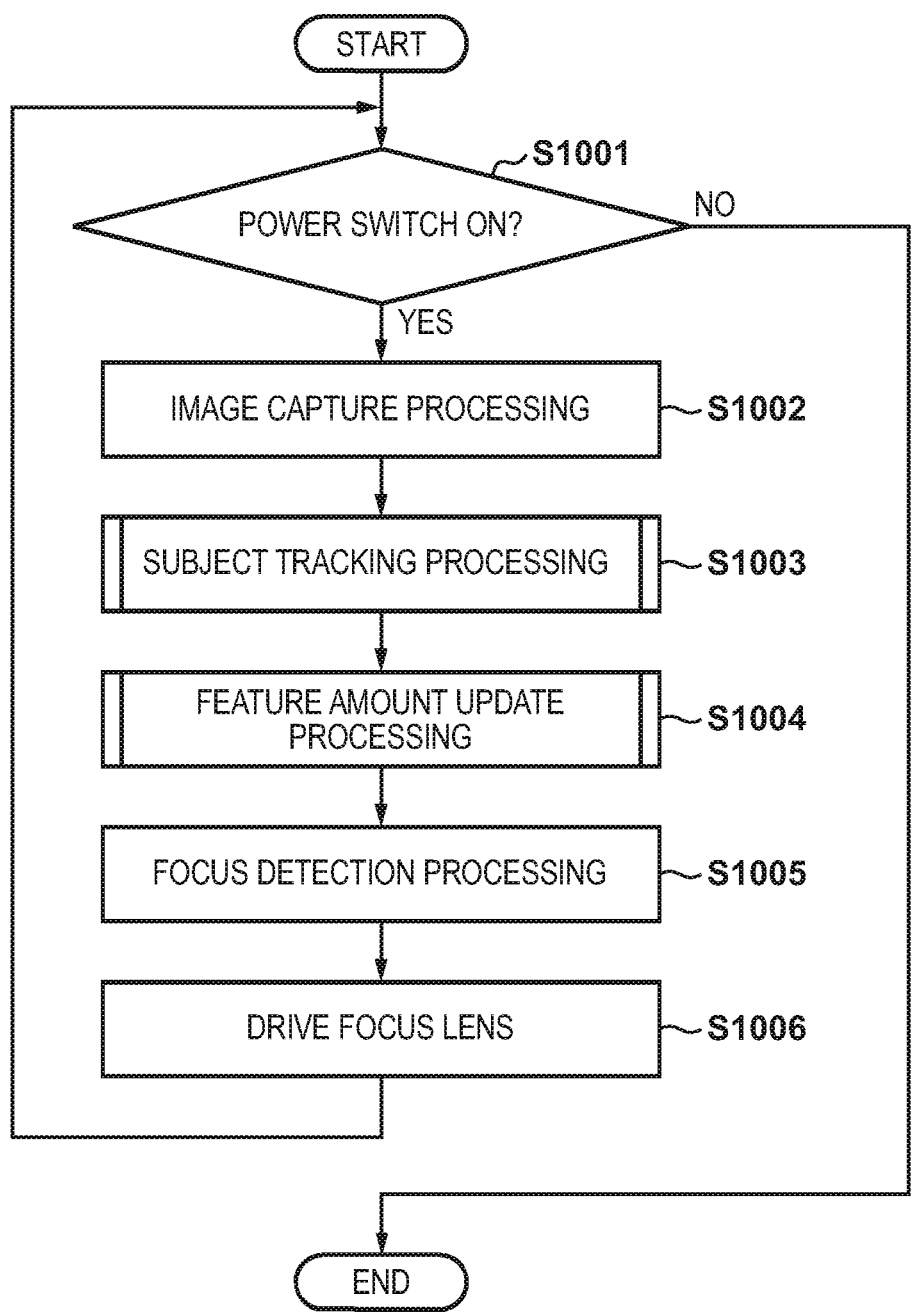
FIG. 10 is a flowchart of image capture processing according to a second embodiment.

Steps S1001 to S1003, S1005, and S1006 in FIG. 10 are the same as steps S801 to S805 in FIG. 8. This embodiment is different from the first embodiment in that feature amount update processing is performed in step S1004 after subject tracking processing is performed in step S1003.

Figure 11:
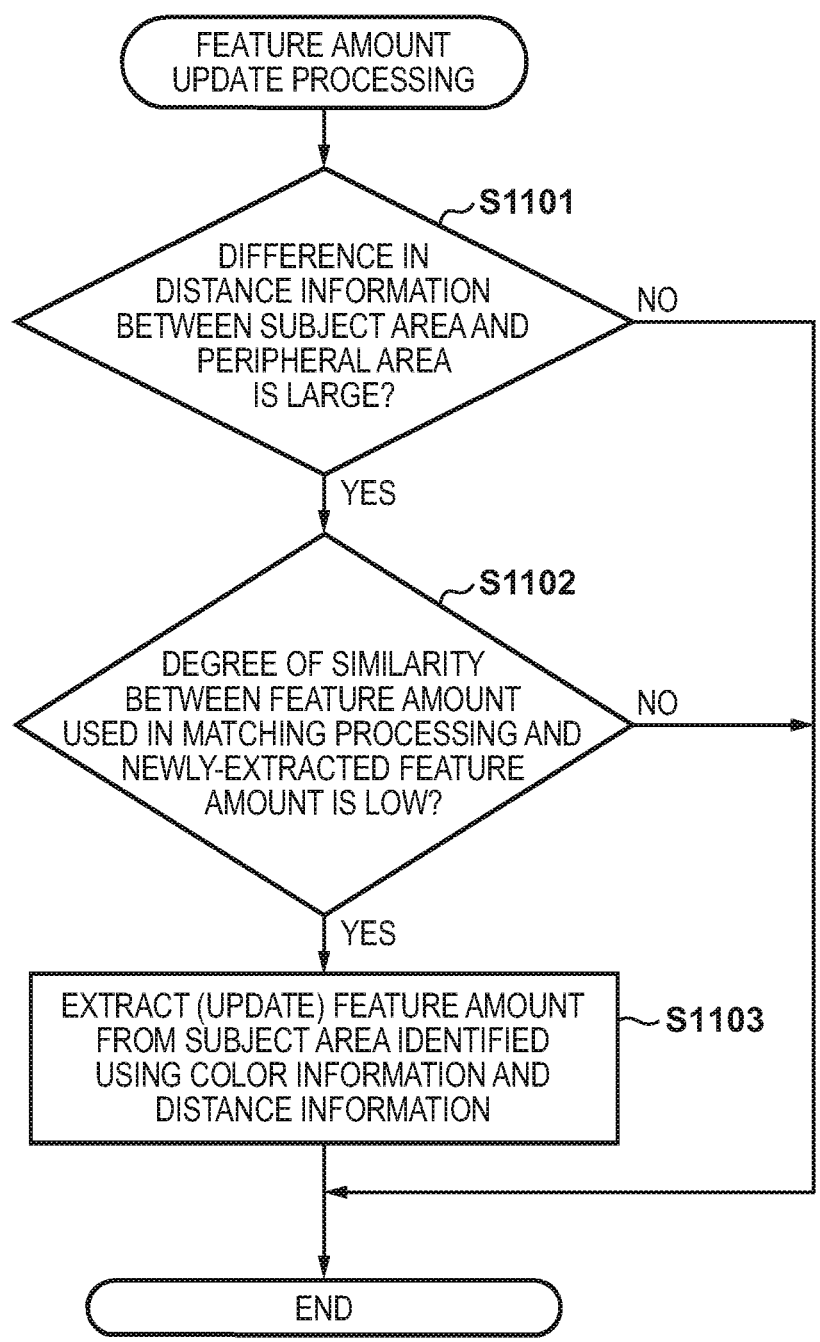
FIG. 11 is a flowchart of subject tracking processing according to the second embodiment.

Next, the details of feature amount update processing performed in step S1004 in FIG. 10 will be described below using the flowchart in FIG. 11.

In step S1101, the tracking circuit 161 (feature extraction circuit 1620) determines, based on the subject area that was searched for in matching processing (S905) and the obtained distance information, whether the difference in the distance information between the subject area and the peripheral area is large.

Figure 12A:
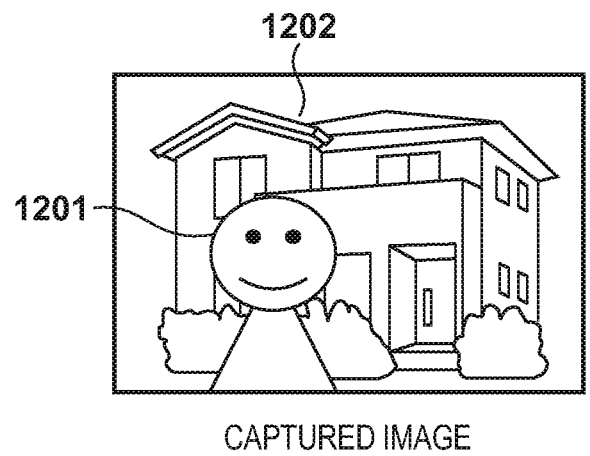
FIGS. 12A to 12D are diagrams schematically showing a method to determine whether to update a feature amount according to the second embodiment.
Figure 12B:
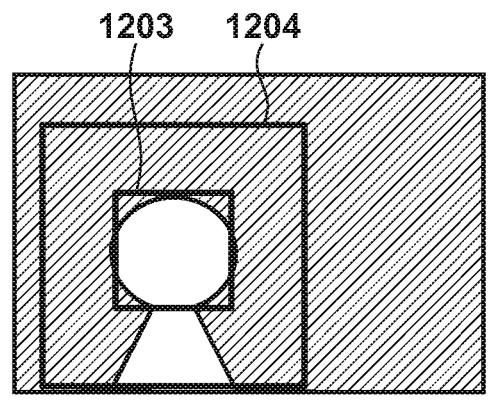
Figure 12C:
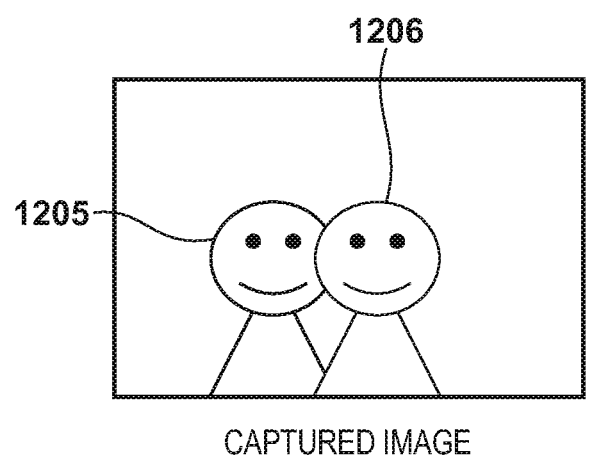
Figure 12D:
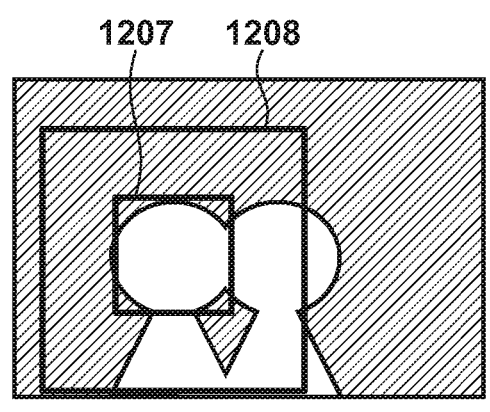

FIGS. 12A and 12C schematically show different captured images, and FIGS. 12B and 12D schematically show distance maps that are generated respectively for the captured images in FIGS. 12A and 12C. In FIG. 12A, a house 1202, which is the background, is present behind a person 1201 at a distance, and in FIG. 12C, another person 1206 is present in front of a person 1205.

In the distance map in FIG. 12B, the distance information regarding each pixel is shown so as to be brighter the smaller the difference from reference distance information that corresponds to the person 1201, which is being subjected to tracking processing, and so as to be darker the greater the difference. Similarly, in the distance map in FIG. 12D, the distance information regarding each pixel is shown so as to be brighter the smaller the difference from reference distance information that corresponds to the person 1205, which is being subjected to tracking processing, and so as to be darker the greater the difference. Note that, although FIGS. 12B and 12D show the distance maps as binary images for the sake of the drawing, the distance maps actually are multi-value gray scale images. Note that, regarding the reference distance information, the distance information that corresponds to the subject area may be an average value of the distance information, or may be the most frequent distance information.

An area 1203 in FIG. 12B and an area 1207 in FIG. 12D are subject areas identified through subject tracking processing in step S1003, and an area 1204 and an area 1208 are peripheral areas of the area 1203 and the area 1207, respectively. Here, a peripheral area of a subject area is defined as a hollow area with its center cropped, obtained by equally enlarging the subject area in the up-down direction and left-right direction, and removing the subject area from an area whose size in the horizontal and vertical directions is triple the size of the subject area. However, this is an example, and the peripheral area may alternatively be defined using other methods.

The tracking circuit 161 (feature extraction circuit 1620) extracts, from the peripheral area, an area having distance information that is similar to the distance information in the main subject area (i.e. an area having distance information with a difference from the distance information in the main subject area that is within a given range), and determines whether the proportion of the extracted area to the entire peripheral area is greater than or equal to a given threshold value. The tracking circuit 161 (feature extraction circuit 1620) ends feature amount update processing if it is determined that this proportion is greater than or equal to the threshold value, and advances the processing to step S1102 if it is not determined that the proportion is greater than or equal to the threshold value.

The determination in step S1101 will now be described. If the proportion of a portion having distance information that is similar to the distance information in the main subject area to the entire peripheral area is small (e.g. less than the threshold value), a situation where the subject area to be tracked and the background area can be clearly distinguished from each other is conceivable. For this reason, even if the feature amount is updated based on the captured image that satisfies this condition, it is conceivable that the background will not significantly affect the updated feature amount.

If the proportion of a portion having distance information that is similar to the distance information in the main subject area to the entire peripheral area is large (e.g. greater than or equal to the threshold value), a situation where the subject area to be tracked and the background area can be barely distinguished from each other is conceivable.

In the examples in FIGS. 12B and 12D, the white area is the area having distance information similar to the distance information that corresponds to the main subject area. The threshold value used in step S1101 can be defined experimentally, for example. Here, it is determined that the proportion of the area having distance information that is similar to the distance information in the main subject area (i.e. an area having distance information with a difference from the distance information in the main subject area that is within a given range) to the entire peripheral area is smaller than the given threshold value in the example shown in FIG. 12B, and is greater than or equal to the given threshold value in the example shown in FIG. 12D.

In step S1102, the tracking circuit 161 (feature extraction circuit 1620) determines, based on the evaluation value (Equation (3)) calculated in matching processing, whether the degree of similarity between the new feature amount extracted from the subject area that was searched for in matching processing and the feature amount that was used in the search for the subject area in matching processing is low. Specifically, the feature extraction circuit 1620 determines whether the new evaluation value calculated by the matching circuit 1610 is higher than an update threshold value, or the evaluation value (Equation (6)) that is based on the Bhattacharyya coefficient is lower than another update threshold value.

If a feature amount whose degree of similarity to the feature amount that was used in the search is low is extracted from the subject area that was found in the search, it is conceivable that, although the subject area has been found, the appearance of the subject area has changed, and it is highly necessary to update the feature amount. On the other hand, if a feature amount whose degree of similarity to the feature amount that was used in the search is high is extracted from the subject area that was found in the search, it is conceivable that the appearance of the subject area has not significantly changed, and the update of the feature amount is not highly required.

Accordingly, the tracking circuit 161 (feature extraction circuit 1620) advances the processing to step S1103 if it is determined in step S1102 that the degree of similarity is low, and ends feature amount update processing if it is not determined that the degree of similarity is low.

In step S1103, the tracking circuit 161 (feature extraction circuit 1620) updates the feature amount to be used in matching processing with a new feature amount extracted from the subject area that was found in the search, as in step S908. The updating method is not particularly limited. For example, the feature amount that has been used in matching processing thus far may be completely replaced with a new feature amount, or an updated feature amount may be calculated using the feature amount that has been used in matching processing thus far and a new feature amount. For example, in the case of the evaluation value based on the sum of absolute differences (Equation (3)), the updated feature amount can be obtained using Equation (8).

$$T(i,j) = T\text{pre}(i,j) \times \alpha + T\text{now}(i,j) \times (1-\alpha), 0 <= \alpha <= 1 \quad (8)$$

Here, Tpre(i, j) denotes the feature amount that has been used in matching processing, Tnow(i, j) denotes the new feature amount, and T(i, j) denotes the updated feature amount.

In the case of the evaluation value based on the Bhattacharyya coefficient (Equation (6)), the updated feature amount can be obtained using Equation (9).

$$p(m)=p\text{pre}(m)\times\alpha+p\text{now}(m)\times(1-\alpha), 0<=\alpha<=1 \qquad (9)$$

Here, ppre(m) denotes the feature amount that has been used in matching processing, pnow(m) denotes the new feature amount, and p(m) denotes the updated feature amount.

In both Equations (8) and (9), $\alpha=0$ indicates updating to completely replace the current feature amount with the newly extracted feature amount, and $\alpha=1$ indicates that the feature amount is not updated. The degree of updating a can be adaptively determined in accordance with, for example, at least one of the magnitude of the difference in the distance information determined in step S1101 and the degree of similarity determined in step S1102.

For example, after the determination conditions in steps S1101 and S1102 have been satisfied, the updated feature amount can be calculated by decreasing the value of the degree of updating a (i.e. increasing the contribution of the new feature amount) as the difference in the distance information increases and as the degree of similarity decreases. Also, after the determination conditions in steps S1101 and S1102 have been satisfied, the updated feature amount can be calculated by increasing the value of the degree of updating a (i.e. reducing the contribution of the new feature amount) as the difference in the distance information decreases and as the degree of similarity increases.

Furthermore, if an operation to determine the in-focus distance or exposure (e.g. an operation that corresponds to a capture-preparation instruction or a capture-start instruction, the operation having been made to a shutter button included in the operation member 156) has been detected, it is conceivable that subject tracking processing is successful at this time point. Accordingly, if an operation to determine the in-focus distance or exposure has been detected, the threshold value to be used in the determination in steps S1101 and S1102 may be changed so that the feature amount is more likely to be updated with a new feature amount extracted from the subject area that is currently detected.

As described above, according to this embodiment, if a feature amount can be accurately extracted from the subject area using the distance information, the feature amount can be updated. For this reason, even in the case where the appearance of the subject area to be tracked changes, the feature amount can be updated without decreasing the tracking accuracy, and subject tracking performance can be further improved.

Other Embodiments

Note that, although the above embodiments have described the case of tracking a subject when capturing the subject, similar subject tracking can also be performed when a video is reproduced, if distance information is acquirable. In this case, distance information recorded in the frames of the video may be acquired, or if each frame is recorded in the form of a pair of parallax images, a configuration may be employed in which distance information is generated based on the parallax images, and the parallax images are composited to generate a video frame to be reproduced. Of course, distance information may be acquired using other methods.

In the case of executing subject tracking during reproduction, the tracking result can be used in the control of a video display method, for example. For example, it is possible to perform control so that the subject area that is being tracked is displayed at the center of the screen, or to perform control so that the subject area that is being tracked is displayed with the size thereof scaled so as to be fixed. An index for identifying the subject area that is being tracked (e.g. a circumscribed rectangular frame of the subject area) may be overlapped in the display. Note that these are merely examples, and the tracking result may be used for other usage.

The mode of overlapping display of the index for identifying the subject area that is being tracked may be different between when the subject area is identified by referencing the distance information and when it is identified using only the color information. For example, when the subject area is identified using only the color information, the accuracy of the subject area is likely to be low, and so an index at a fixed position and having a fixed size is displayed. When the subject area is identified by referencing the distance information, the position and size of the index are dynamically changed in accordance with the position and size of the subject area.

The present invention is applicable not only to capturing videos but also capturing and reproducing a plurality of time-series images, as in the case of continuous shooting or interval shooting.

The above embodiments are merely specific examples for the purpose of helping understanding of the present invention, and is not intended to limit the present invention to the above embodiments in any sense. All embodiments included in the scope defined by the claims are embraced in the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above embodiment(s) and/or that includes one or more circuits (e.g., application specific integrated circuit (ASIC)) for performing the functions of one or more of the above embodiment(s), and by a method performed by the computer of the system or apparatus by, for example, reading out and executing the computer executable instructions from the storage medium to perform the functions of one or more of the above embodiment(s) and/or controlling the one or more circuits to perform the functions of one or more of the above embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-122880, filed on Jun. 21, 2016 and 2017-084763, filed on Apr. 21, 2017, which are hereby incorporated by reference herein in their entirety.

What is claimed is:

1. An image processing apparatus comprising:
    circuitry which:
    extracts a feature amount from a first image area in a captured image captured by an image sensor; and
    searches a plurality of images for an image area being similar to the first image area, using the feature amount,
    wherein the circuitry determines whether or not to update the feature amount used in the search, based on a size of a second image area at a periphery of the first image area in the captured image, the second image area having distance information whose difference from the distance information corresponding to the first image area is within a given range.

2. The image processing apparatus according to claim 1, wherein the circuitry determines to update the feature amount used in the search if a proportion of the second image area to a peripheral area of the first image area is greater than or equal to a threshold value.

3. The image processing apparatus according to claim 2, wherein the circuitry changes a degree of updating of the feature amount used in the search, in accordance with the proportion of the second area to the peripheral area.

4. A method for controlling an image processing apparatus, the method comprising:
    extracting a feature amount from a first image area in a captured image captured by an image sensor; and
    searching a plurality of images for an image area similar to the first image area, using the feature amount,
    wherein whether or not to update the feature amount used in the search is determined based on a size of a second image area at a periphery of the first image area in the captured image, the second image area having distance information whose difference from the distance information corresponding to the first image area is within a given range.

5. A non-transitory computer-readable medium storing a computer program including a computer-executable command, the command, upon being executed by a computer, causing the computer to function as an image processing apparatus to:
    extract a feature amount from a first image area in a captured image captured by an image sensor;
    search a plurality of images for an image area being similar to the image area, using the feature amount; and
    determine whether or not to update the feature amount used in the search, based on a size of a second image area at a periphery of the first image area in the captured image, the second image area having distance information whose difference from the distance information corresponding to the first image area is within a given range.

* * * * *